(12) United States Patent
Minami

(10) Patent No.: US 10,084,290 B2
(45) Date of Patent: Sep. 25, 2018

(54) MULTIPOINT IGNITION DEVICE AND MULTIPOINT IGNITION ENGINE

(71) Applicant: MIYAMA, INC., Nagano-shi, Nagano (JP)

(72) Inventor: Katsuaki Minami, Nagano (JP)

(73) Assignee: MIYAMA, INC., Nagano-shi (JP)

( * ) Notice: Subject to any disclaimer, the term of this patent is extended or adjusted under 35 U.S.C. 154(b) by 0 days.

(21) Appl. No.: 15/892,577

(22) Filed: Feb. 9, 2018

(65) Prior Publication Data

US 2018/0241180 A1   Aug. 23, 2018

(30) Foreign Application Priority Data

Feb. 22, 2017   (JP) .................................. 2017-045431

(51) Int. Cl.
| H01T 13/46 | (2006.01) |
| H01T 13/32 | (2006.01) |
| H01T 13/08 | (2006.01) |
| F02P 15/08 | (2006.01) |

(52) U.S. Cl.
CPC ............ H01T 13/462 (2013.01); F02P 15/08 (2013.01); H01T 13/08 (2013.01); H01T 13/32 (2013.01)

(58) Field of Classification Search
CPC ....... H01T 13/462; H01T 13/32; H01T 13/08; F02P 15/08
See application file for complete search history.

(56) References Cited

U.S. PATENT DOCUMENTS

| 4,974,559 A * | 12/1990 | Nagaoka | F02B 1/00 123/169 PA |
| 7,299,785 B1 | 11/2007 | Lee | |
| 7,441,540 B1 | 10/2008 | Minami | |
| 2007/0209634 A1 * | 9/2007 | Minami | F02P 5/00 123/310 |
| 2012/0242215 A1 * | 9/2012 | Hwang | H01T 13/54 313/143 |
| 2013/0206122 A1 * | 8/2013 | Chiera | H01T 13/54 123/594 |
| 2014/0345552 A1 * | 11/2014 | Ando | F02P 13/00 123/169 EL |
| 2015/0211431 A1 * | 7/2015 | Harada | F02B 17/005 123/295 |

FOREIGN PATENT DOCUMENTS

| JP | 57148022 A | 9/1982 |
| JP | 02238176 A | 9/1990 |
| JP | 2009047057 A | 3/2009 |
| JP | 2010185430 A | 8/2010 |

OTHER PUBLICATIONS

EP Search Report issued in corresponding EP Application No. 18 15 4111, dated Jul. 24, 2018.

* cited by examiner

*Primary Examiner* — Kevin Quarterman
(74) *Attorney, Agent, or Firm* — Greer Burns & Crain Ltd.

(57) ABSTRACT

A multipoint ignition device for igniting an air-fuel mixture in a combustion chamber of an engine includes: an insulating member formed in an annular shape such that an inner periphery thereof faces the combustion chamber; a plurality of electrodes held on the insulating member so as to form a plurality of ignition gaps inside the combustion chamber; a main body portion provided on an outer periphery of the insulating member; and an intermediate member that is provided between the main body portion and the insulating member and has a larger thermal expansion coefficient than the insulating member.

6 Claims, 4 Drawing Sheets

MULTIPOINT IGNITION DEVICE AND MULTIPOINT IGNITION ENGINE

TECHNICAL FIELD

The present invention relates to a multipoint ignition device having a plurality of ignition gaps, and a multipoint ignition engine that includes the multipoint ignition device.

BACKGROUND ART

JP2009-047057A discloses an internal combustion engine having an annular ignition device on an outer peripheral side of a combustion chamber. The ignition device includes an annular main body portion, and a central electrode portion, a conductive portion, and an earth that together form a plurality of ignition gaps.

SUMMARY OF INVENTION

However, in the internal combustion engine disclosed in JP2009-047057A, the ignition device is configured such that an outer periphery of the main body portion is held by a cylinder head and a cylinder block. The main body portion is formed from an insulating material such as a ceramic, while the cylinder head and the cylinder block are formed from a metallic material such as aluminum alloy or cast iron. Therefore, when a temperature of the internal combustion engine increases, the ignition device may no longer be held securely due to a thermal expansion coefficient difference.

An object of the present invention is to provide a multipoint ignition device in which an ignition device can be held securely even when a temperature increase occurs.

According to one aspect of this invention, a multipoint ignition device for igniting an air-fuel mixture in a combustion chamber of an engine, includes: an insulating member formed in an annular shape such that an inner periphery thereof faces the combustion chamber; a plurality of electrodes held on the insulating member so as to form a plurality of ignition gaps inside the combustion chamber; a main body portion provided on an outer periphery of the insulating member; and an intermediate member that is provided between the main body portion and the insulating member and has a larger thermal expansion coefficient than the insulating member.

According to another aspect of this invention, a multipoint ignition engine including the multipoint ignition device as described above is provided.

According to these aspects, when the temperature of the engine increases, leading to an increase in the temperature of the multipoint ignition device, the main body portion undergoes greater thermal expansion than the insulating member. At this time, in the multipoint ignition device, the intermediate member is provided between the main body portion and the insulating member. Therefore, when the temperature of the multipoint ignition device increases, the intermediate member undergoes thermal expansion, and as a result, formation of a gap between the main body portion and the insulating member is suppressed. Hence, even when the temperature of the engine increases, leading to an increase in the temperature of the multipoint ignition device, the insulating member can be held securely.

DESCRIPTION OF EMBODIMENT

Referring to FIGS. 1 to 4, a multipoint ignition device 100 according to an embodiment of the present invention will be described.

First, referring to FIG. 1, a configuration of a multipoint ignition engine (referred to simply as "the engine" hereafter) 1 that includes the multipoint ignition device 100 will be described.

Figure 1:
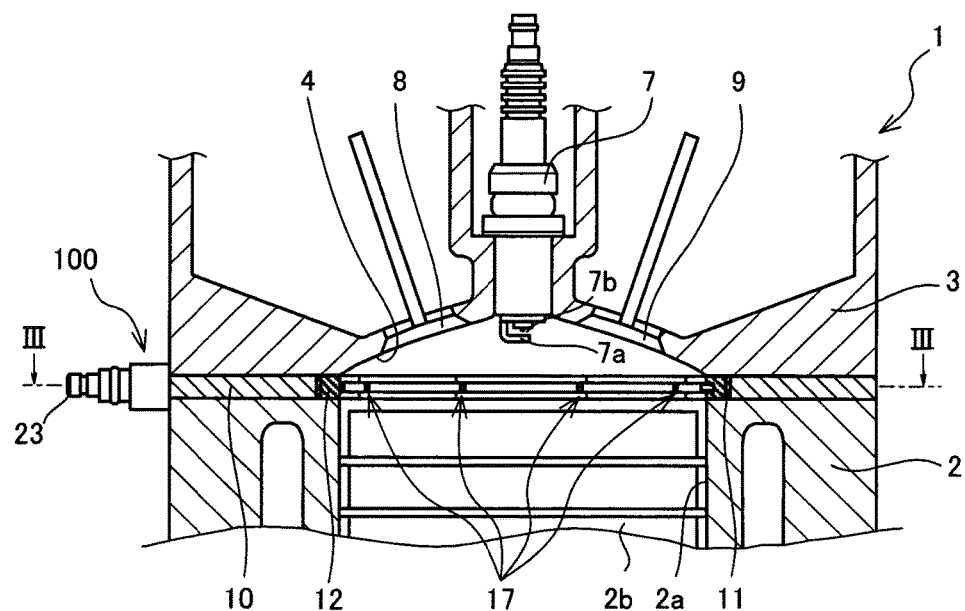
FIG. 1 is a sectional side view illustrating a condition in which a multipoint ignition device according to an embodiment of the present invention is attached to an engine.

As shown in FIG. 1, the engine 1 includes a cylinder block 2, a cylinder 2a formed in the cylinder block 2, a piston 2b that reciprocates through the cylinder 2a, a cylinder head 3 that is attached to the cylinder block 2 in order to close a top portion of the cylinder 2a, a spark plug 7, and the multipoint ignition device 100, which is provided between the cylinder block 2 and the cylinder head 3. A combustion chamber 4 is formed in the engine 1 by the cylinder 2a, the piston 2b, and the cylinder head 3.

The spark plug 7 is disposed in an upper portion of the combustion chamber 4. The engine 1 is a spark ignition internal combustion engine that obtains power when the multipoint ignition device 100 and the spark plug 7 ignite and burn a compressed air-fuel mixture in the combustion chamber 4.

In the engine 1, the compressed air-fuel mixture in the combustion chamber 4 is ignited by the multipoint ignition device 100 and the spark plug 7. More specifically, an ignition current from an ignition coil (not shown) is input from an input terminal 22, whereby sparks are generated in a plurality of ignition gaps 17 of the multipoint ignition device 100 and an ignition gap 7b of the spark plug 7.

Hence, in the engine 1, ignition is executed by the multipoint ignition device 100 in addition to the spark plug 7, and therefore a flame flow can be generated by combustion. Accordingly, rapid combustion can be realized without providing a squish area, and as a result, cooling loss can be reduced.

Next, referring to FIGS. 2 and 3, a configuration of the multipoint ignition device 100 will be described.

Figure 2:
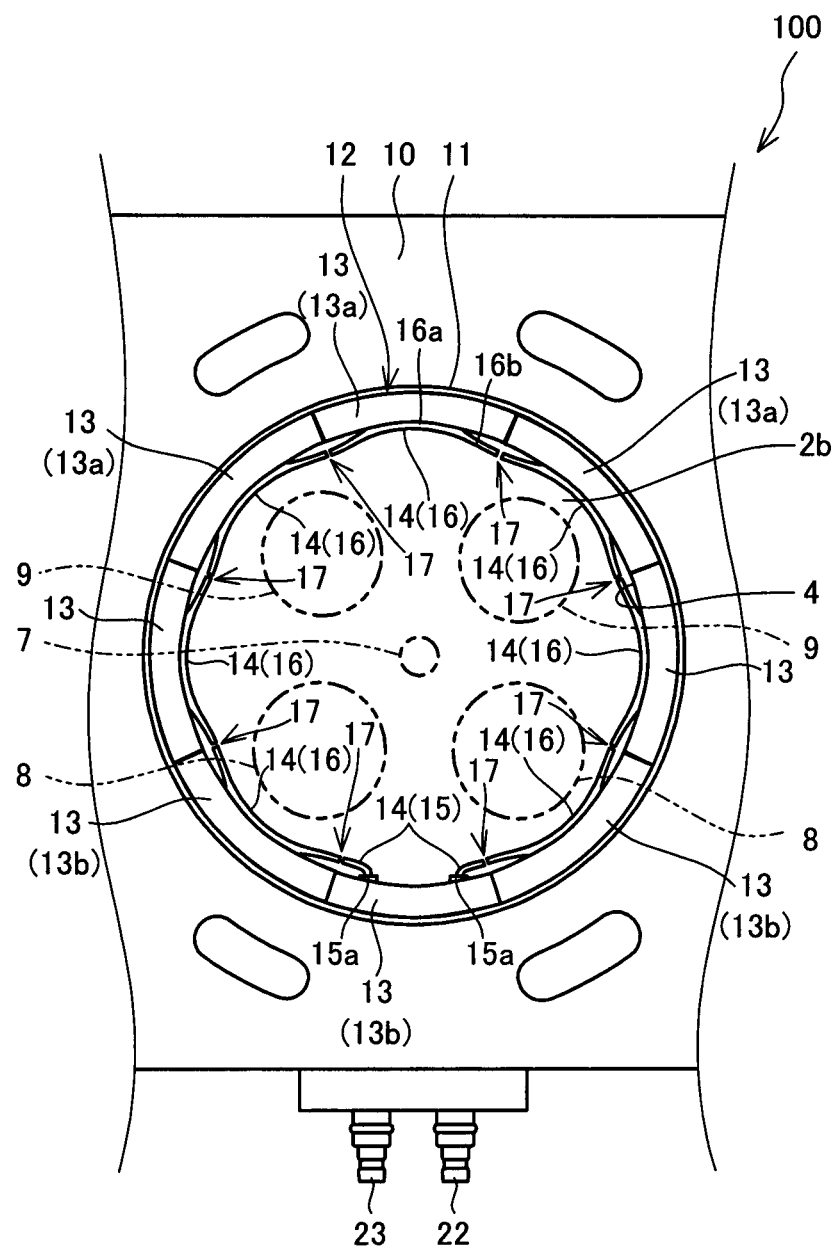
FIG. 2 is a plan view of the multipoint ignition device according to this embodiment of the present invention.
Figure 3:
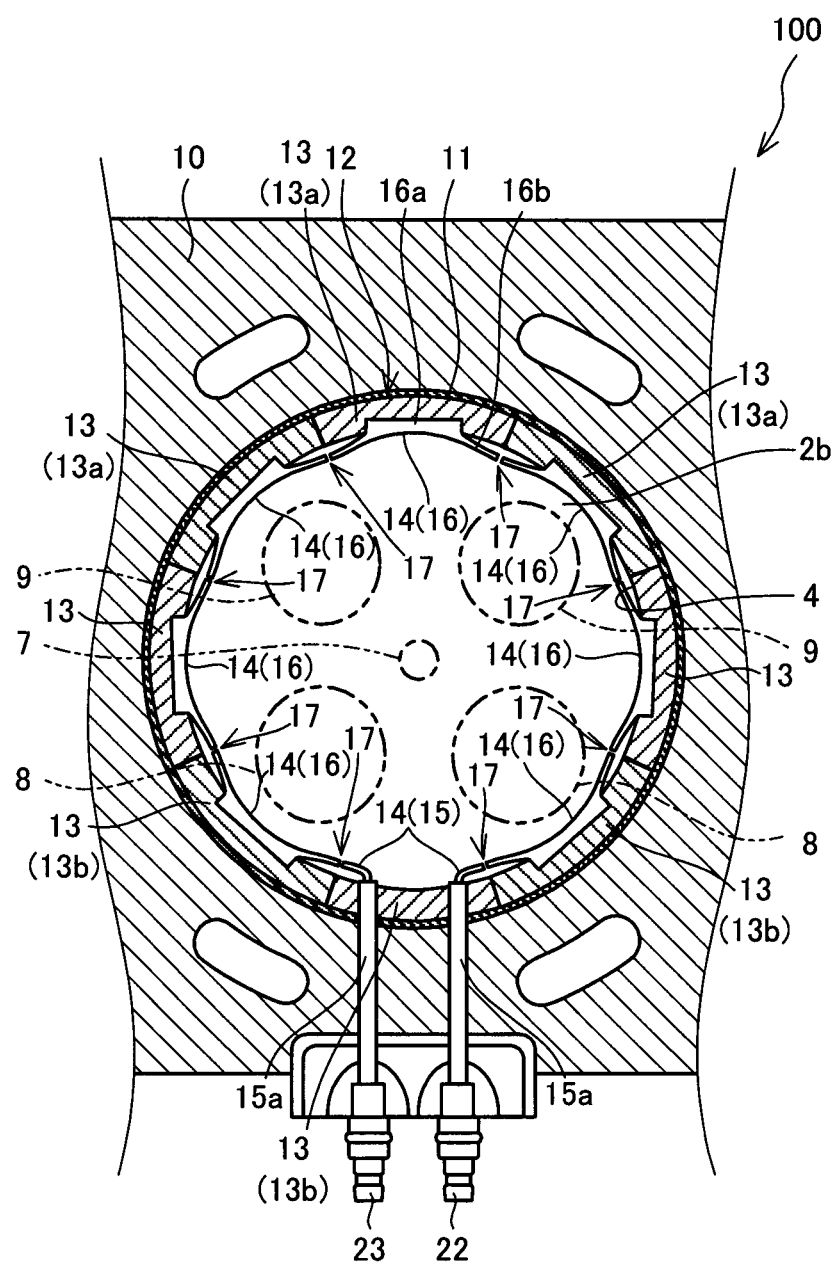
FIG. 3 is a sectional view of FIG. 1.

As shown in FIG. 2, the multipoint ignition device 100 includes a main body portion 10, a ring body 11 serving as an intermediate member, an insulating member 12, and a plurality of electrodes 14.

The main body portion 10 is provided between the cylinder block 2 and the cylinder head 3. The main body portion 10 is provided on an outer periphery of the insulating member 12. The main body portion 10 may be used as a gasket, or a gasket (not shown) may be provided separately to the main body portion 10. The main body portion 10 is formed from a metal such as aluminum alloy, for example.

The input terminal 22 into which the input current is input from the ignition coil, and a connection terminal 23 that is connected to the input terminal 22 or the spark plug 7 of another multipoint ignition device 100 are provided in the main body portion 10.

Thus, the multipoint ignition device 100 of another cylinder 2a can be connected in series to the front of the multipoint ignition device 100 via a plug cord (not shown) such that ignition can be executed by both multipoint ignition devices 100 simultaneously. Further, the multipoint ignition device 100 and the spark plug 7 provided in the single combustion chamber 4 can be connected to each other in series via a plug cord (not shown) so as to execute ignition simultaneously. At this time, a ground electrode 7a of the spark plug 7 is earthed by contacting the cylinder head 3.

The ring body 11 is provided between the main body portion 10 and the insulating member 12. The ring body 11 is formed in an annular shape. The ring body 11 holds the outer periphery of the insulating member 12 on the main body portion 10. An outer periphery of the ring body 11 is formed at an identical size to an inner periphery of the main body portion 10. An inner periphery of the ring body 11 is formed at an identical size to the outer periphery of the insulating member 12.

The ring body 11 is formed from a material that deforms elastically more easily than the insulating member 12. For example, the ring body 11 is formed from a foamed metal such as foamed aluminum. It should be noted that as long as the ring body 11 has a smaller modulus of elasticity than the insulating member 12, the ring body 11 may be formed from an aluminum alloy rather than a foamed material. The ring body 11 absorbs a shock generated when the air-fuel mixture is burned in the combustion chamber 4. Therefore, by providing the ring body 11, the insulating member 12 can be protected from the shock generated when the air-fuel mixture is burned in the combustion chamber 4.

The ring body 11 is formed from a material having a larger thermal expansion coefficient than the insulating member 12. The ring body 11 is also formed from a material having a larger thermal expansion coefficient than the main body portion 10. For example, the ring body 11 is formed from an aluminum alloy having a larger thermal expansion coefficient than the main body portion 10.

When a temperature of the engine 1 increases, leading to an increase in a temperature of the multipoint ignition device 100, the main body portion 10 undergoes greater thermal expansion than the insulating member 12. At this time, in the multipoint ignition device 100, the ring body 11 is provided between the main body portion 10 and the insulating member 12. Therefore, when the temperature of the multipoint ignition device 100 increases, the ring body 11 undergoes thermal expansion, and as a result, formation of a gap between the main body portion 10 and the insulating member 12 is suppressed. Hence, even when the temperature of the engine 1 increases, leading to an increase in the temperature of the multipoint ignition device 100, the insulating member 12 can be held securely.

Further, the ring body 11 is provided in an annular shape that is concentric with the insulating member 12, and therefore the insulating member 12 can be held by an identical force around the entire periphery thereof, rather than force being exerted on the periphery of the insulating member 12 in a biased manner.

The insulating member 12 is formed in an annular shape such that an inner periphery thereof faces the combustion chamber 4. The insulating member 12 is formed from an insulator such as a ceramic, for example. The insulating member 12 includes a plurality of divided insulating members 13 formed in divided form so as to respectively hold the electrodes 14.

Each divided insulating member 13 holds either a pair of side electrodes 15 or a single intermediate electrode 16, as will be described below. The ignition gaps 17 are respectively formed to face seams between adjacent divided insulating members 13. The divided insulating members 13 are held on the main body portion 10 via the ring body 11. The divided insulating members 13 are connected to each other by an adhesive, a brazing material, or the like. The divided insulating members 13 are connected to the ring body 11 and the main body portion 10 by an adhesive, a brazing material, or the like.

Hence, the multipoint ignition device 100 includes the divided insulating members 13 formed in divided form so as to respectively hold the electrodes 14. There is therefore no need to form a multipoint ignition device having a plurality of electrodes integrated therewith, and instead, the multipoint ignition device 100 can be manufactured by forming the divided insulating members 13 separately and then combining the separately formed divided insulating members 13. As a result, a multipoint ignition device 100 having a structure that is easy to manufacture can be provided.

Further, when one of the intermediate electrodes 16 is damaged, for example, only the divided insulating member 13 holding the damaged intermediate electrode 16 need be exchanged for a new one. Hence, there is no need to exchange the entire multipoint ignition device 100.

The divided insulating members 13 are formed by dividing the annular insulating member 12 in a circumferential direction. The divided insulating members 13 include an exhaust side insulating member 13a that is close to an exhaust valve 9 of the engine 1, and an intake side insulating member 13b that is close to an intake valve 8 of the engine 1. The intake side insulating member 13b has a higher thermal conductivity than the exhaust side insulating member 13a.

Hence, with the single multipoint ignition device 100, a heat value on the intake valve 8 side, where the temperature rises less easily, can be reduced, and a heat value on the exhaust valve 9 side, where the temperature rises more easily, can be increased.

The electrodes 14 are held by the insulating member 12 so as to form the plurality of ignition gaps 17 in the circumferential direction inside the combustion chamber 4. The electrodes 14 include the pair of side electrodes 15 and the plurality of intermediate electrodes 16.

The side electrodes 15 are held on a single divided insulating member 13. The side electrodes 15 are held on the divided insulating member 13 via insulators 15a. The side electrodes 15 are formed to extend around an inner periphery of the combustion chamber 4 in opposite directions.

The insulators 15a project partially from an inner peripheral surface of the divided insulating member 13, and are formed to be long enough to penetrate the main body portion 10.

A first side electrode 15 penetrates the insulating member 12 and the main body portion 10 so as to extend to the input terminal 22. Similarly, a second side electrode 15 penetrates the insulating member 12 and the main body portion 10 so as to extend to the connection terminal 23. The ignition current from the ignition coil is input into the first side electrode 15 via the input terminal 22.

The intermediate electrodes 16 are provided in series in a row between the first side electrode 15 and the second side electrode 15. Each intermediate electrode 16 forms an ignition gap 17 with the intermediate electrode 16 that is adjacent thereto. The intermediate electrodes 16 that are adjacent to the side electrodes 15 form ignition gaps 17 with the side electrodes 15.

The intermediate electrodes 16 project into the combustion chamber 4 from the insulating member 12. The intermediate electrodes 16 each include a support portion 16a held on the insulating member 12, and an electrode portion 16b formed integrally with the support portion 16a and positioned inside the combustion chamber 4.

The support portion 16a is configured such that a base end portion thereof is held on the divided insulating member 13 and a tip end portion thereof projects into the combustion chamber 4.

The electrode portion 16b is provided on the tip end portion of the support portion 16a. The electrode portion 16b is formed in an arc shape extending around an inner peripheral surface of the combustion chamber 4. The ignition gap 17 is formed at each end of the electrode portion 16b.

The electrode portion 16b is exposed to the interior of the combustion chamber 4 over the entire length thereof. Therefore, when the air-fuel mixture is burned in the combustion chamber 4, the entire electrode portion 16b is heated. Accordingly, a large surface area is exposed to the flame, and as a result, the heat value can be reduced.

According to the first embodiment, described above, following effects are obtained.

When the temperature of the engine 1 increases, leading to an increase in the temperature of the multipoint ignition device 100, the main body portion 10 undergoes greater thermal expansion than the insulating member 12. At this time, in the multipoint ignition device 100, the ring body 11 is provided between the main body portion 10 and the insulating member 12. Therefore, when the temperature of the multipoint ignition device 100 increases, the ring body 11 undergoes thermal expansion, and as a result, formation of a gap between the main body portion 10 and the insulating member 12 is suppressed. Hence, even when the temperature of the engine 1 increases, leading to an increase in the temperature of the multipoint ignition device 100, the insulating member 12 can be held securely.

Embodiments of this invention were described above, but the above embodiments are merely examples of applications of this invention, and the technical scope of this invention is not limited to the specific constitutions of the above embodiments.

For example, in the multipoint ignition device 100, the main body portion 10 is provided between the cylinder block 2 and the cylinder head 3, but instead, a groove for holding the insulating member 12 may be formed in the cylinder block 2 or the cylinder head 3, and the cylinder block 2 or the cylinder head 3 may be used as the main body portion.

Further, in the multipoint ignition device 100, the annular ring body 11 is used as the intermediate member, but instead, the insulating member 12 may be held by providing spring materials in a plurality of locations (three locations, for example) in the circumferential direction, for example. Furthermore, the insulating member 12 may be held using an intermediate member formed from a highly heat-resistant resin material that is heat-resistant to a higher temperature than a maximum interior temperature of the combustion chamber 4. Hence, the intermediate member may take any form with which the insulating member 12 can be held elastically on the main body portion 10.

Figure 4:
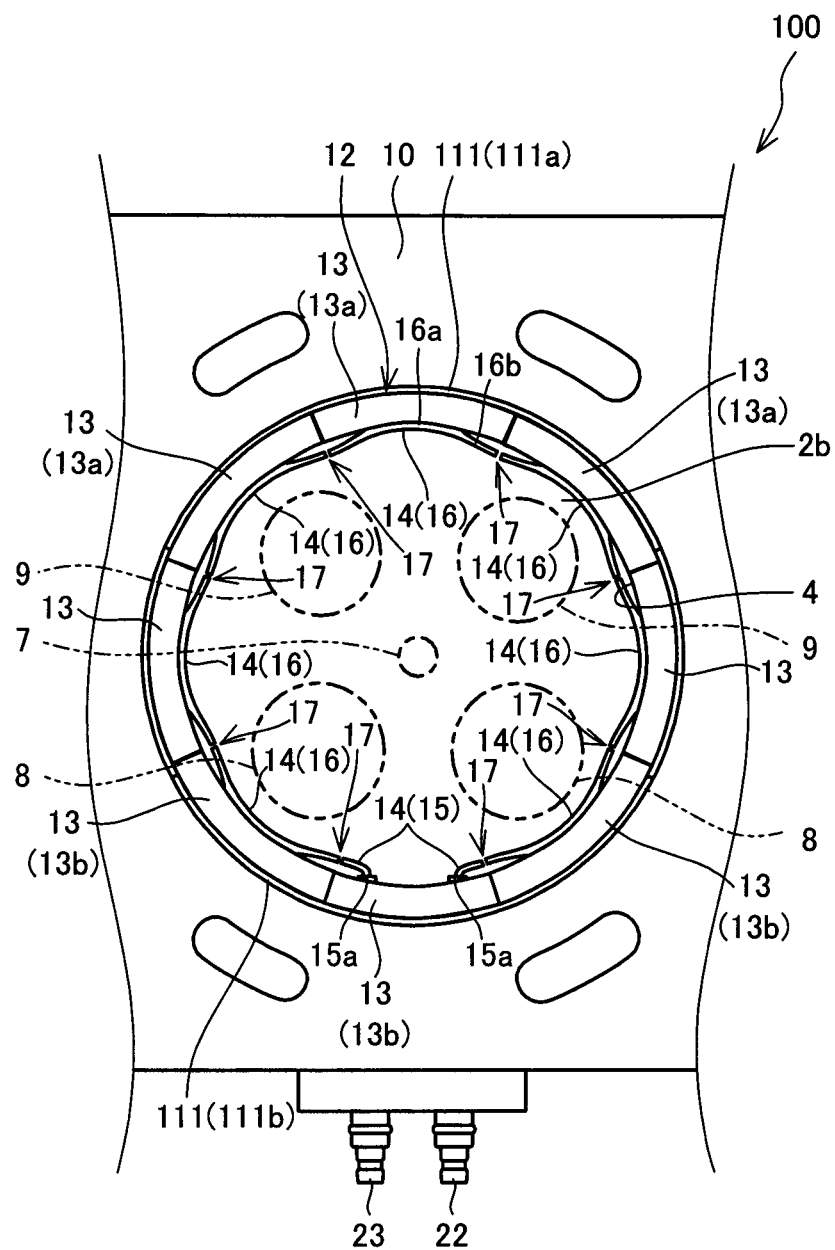
FIG. 4 is a plan view of a multipoint ignition device according to a modified example of this embodiment of the present invention.

In a modified example shown in FIG. 4, the multipoint ignition device 100 includes a plurality of divided intermediate members 111 formed in an arc shape so as to serve as the intermediate member. The divided intermediate members 111 are formed so as to be divided into a plurality in the circumferential direction of the insulating member 12. The divided intermediate members 111 include an exhaust side divided intermediate member 111a that is close to the exhaust valve 9 of the engine 1, and an intake side divided intermediate member 111b that is close to the intake valve 8 of the engine 1.

Here, the intake side divided intermediate member 111b and the exhaust side divided intermediate member 111a may be formed from materials having different thermal conductivity values. For example, the intake side divided intermediate member 111b is formed from a material having a lower thermal conductivity than the exhaust side divided intermediate member 111a. In this case, the intake side insulating member 13b held by the intake side divided intermediate member 111b is less likely to radiate heat, while the exhaust side insulating member 13a held by the exhaust side divided intermediate member 111a is more likely to radiate heat.

Hence, with the multipoint ignition device 100, the heat value on the intake valve 8 side, where the temperature rises less easily, can be reduced, and the heat value on the exhaust valve 9 side, where the temperature rises more easily, can be increased.

It should be noted that in the modified example shown in FIG. 4, the divided intermediate members 111 are provided in a pair, but the present invention is not limited thereto, and the intermediate member may be formed by combining three or more arc-shaped divided intermediate members.

This application claims priority based on Japanese Patent Application No. 2017-045431 filed with the Japan Patent Office on Feb. 22, 2017, the entire contents of which are incorporated into this specification.

What is claimed is:

1. A multipoint ignition device for igniting an air-fuel mixture in a combustion chamber of an engine, comprising:
   an insulating member formed in an annular shape such that an inner periphery thereof faces the combustion chamber;
   a plurality of electrodes held on the insulating member so as to form a plurality of ignition gaps inside the combustion chamber;
   a main body portion provided on an outer periphery of the insulating member; and
   an intermediate member that is provided between the main body portion and the insulating member and has a larger thermal expansion coefficient than the insulating member.

2. The multipoint ignition device according to claim 1, wherein the intermediate member is formed in an annular shape that is concentric with the insulating member.

3. The multipoint ignition device according to claim 1, wherein the intermediate member is formed so as to be divided into a plurality in a circumferential direction of the insulating member.

4. The multipoint ignition device according to claim 1, wherein the intermediate member has a larger thermal expansion coefficient than the main body portion.

5. The multipoint ignition device according to claim 1, wherein the intermediate member is formed from a foamed metal.

6. A multipoint ignition engine comprising a multipoint ignition device according to claim 1.

* * * * *